US005711999A

United States Patent [19]

Yamada et al.

[11] Patent Number: 5,711,999
[45] Date of Patent: Jan. 27, 1998

[54] METHOD FOR MODIFYING THE FILM OF A PHOTOSENSITIVE CHEMICAL MATERIAL

[75] Inventors: Fumiaki Yamada, Kanagawa-ken; Yoichi Taira, Tokyo-to, both of Japan

[73] Assignee: International Business Machines Corporation, Armonk, N.Y.

[21] Appl. No.: 697,658

[22] Filed: Aug. 28, 1996

[30] Foreign Application Priority Data

Aug. 28, 1995 [JP] Japan .................................. 7-218681

[51] Int. Cl.[6] ...................................................... B05D 3/00
[52] U.S. Cl. ...................... 427/555; 427/256; 427/384; 427/553; 427/558; 427/581; 427/582
[58] Field of Search ......................... 427/582, 555, 427/558, 581, 282, 384, 256, 553

[56] References Cited

U.S. PATENT DOCUMENTS

| | | | |
|---|---|---|---|
| 4,631,199 | 12/1986 | Hall et al. ................ | 427/582 X |
| 4,685,976 | 8/1987 | Schachameyer ........... | 427/582 X |
| 5,153,023 | 10/1992 | Orlowski et al. ......... | 427/555 |
| 5,281,450 | 1/1994 | Yaniv ....................... | 427/555 X |
| 5,308,651 | 5/1994 | Ohta et al. ................ | 427/582 |
| 5,510,158 | 4/1996 | Hiramoto et al. ......... | 427/582 |
| 5,587,200 | 12/1996 | Lorenz et al. ............. | 427/582 X |
| 5,593,739 | 1/1997 | Kickelhain ................ | 427/555 |

Primary Examiner—Bernard Pianalto
Attorney, Agent, or Firm—Ronald L. Drumheller

[57] ABSTRACT

A method is provided for modifying a photosensitive chemical material which controls exposure to make spectral intensity ratio constant, adjusts the pre-tilt angles of a liquid crystal orientation film easily and accurately, and gives desired properties to the photosensitive chemical material. A photosensitive chemical material is patterned by the photochemical reaction of a photosensitive chemical material. The photosensitive chemical material is irradiated with light emitted from a light source having a line spectrum having almost single wavelength between 200 nm and 300 nm (for example, a low pressure mercury lamp or a laser lamp) according to a pattern to control the reaction of the photosensitive chemical material. Also, the photosensitive chemical material is irradiated with light having a wavelength of 300 nm or longer to make the photosensitive chemical material cause a reaction to occur that selectively generates active oxygen. Also, the photosensitive chemical material is irradiated with ultraviolet light in an atmospheric gas containing desired functional groups in order to introduce the functional groups into the positions of radicals generated by the decomposition reaction of the photosensitive chemical material due to photochemical reaction.

11 Claims, 6 Drawing Sheets

METHOD FOR MODIFYING THE FILM OF A PHOTOSENSITIVE CHEMICAL MATERIAL

FIELD OF THE INVENTION

The present invention relates to a method for modifying the film of a photosensitive chemical material, and more specifically to an effective process for modifying a liquid crystal oriented film to patterns by ultraviolet irradiation, and forming a multi-domain.

RELATED ART

The most basic orientation property in a liquid crystal oriented film is the orientation of the major axes of liquid crystal molecules along the orientation direction controlled by rubbing. In horizontal orientation, when the major axes of liquid crystal molecules are oriented in parallel to the substrate under a field-free condition, discrimination known as a tilt domain is produced by impressing a voltage. This phenomenon is caused because when the liquid crystal molecules rise, they have equivalent energy regardless of the direction of rotation. In order to prevent this, liquid crystals which have risen a little from the substrate must be oriented (tilt orientation) under a field-free condition, and the angle of tilting is called a pre-tilt angle.

The pre-tilt angle influences the electro-optical properties of a liquid crystal display elements, and specific values are required depending on various liquid crystal display elements. Therefore, the ability to adjust the pre-tilt angle of the liquid crystal oriented film to a desired value has been required. In the case of a thin polyimide film used as a liquid crystal oriented film, it has been known that the pre-tilt angle on liquid crystal molecules injected after the assembly of the cell decreases when these molecules are irradiated with deep ultraviolet rays before the cell is assembled. Utilizing this property a liquid crystal display device with an improved view angle has been proposed by dividing a picture element of a liquid crystal cell into two elements having different pre-tilt angles.

However, although pre-tilt angles have been known to decrease with increase in the dose of ultraviolet light, there has been a problem that a conventional mercury-xenon lamp cannot determine the dose for controlling the pre-tilt angle to a predetermined value due to instability of the spectral intensity ratio of ultraviolet light. Also, since orientation becomes deteriorated if the dose of ultraviolet is too much, the techniques for controlling pre-tilt angles more accurately have been demanded. Furthermore, since the potential generated in the area irradiated with ultraviolet light differs from the potential generated in the area not irradiated with ultraviolet light, and problems of difference in driving voltage or image sticking may arise, techniques for giving desired properties to photosensitive chemical materials have been demanded.

SUMMARY OF THE INVENTION

It is the first object of the present invention to provide a method for modifying the film of a photosensitive chemical material by making spectral intensity ratio to control the exposure dose, thus facilitating the control of pre-tilt angles.

It is the second object of the present invention to provide a method for modifying the film of a photosensitive chemical material, which can control pre-tilt angles more accurately.

It is the third object of the present invention to provide a method for modifying the film of a photosensitive chemical material, which can give desired properties to photosensitive materials.

The first object of the present invention is achieved by a method for modifying the film of a photosensitive chemical in the method for forming film patterns of the photosensitive chemical material using the photochemical reaction of said photosensitive chemical material, comprising the steps of irradiating said photosensitive chemical material with light emitted from a light source having a line spectrum of almost single wavelength between 200 nm and 300 nm according to a pattern, in order to control the degree of reaction of said photosensitive chemical material.

In the present invention, the quantity of light can be measured with a high reproducibility by using a laser or a low pressure mercury lamp as the light source which emits a line spectrum of almost single wavelength between 200 nm and 300 nm, whereby the route of reaction can better known and the reaction can be controlled with a high accuracy. The spectrum of a low pressure mercury lamp corresponds mostly to the emission from mercury atoms in a long life metastable state corresponding to the energy of deep ultraviolet light, and much of electrical energy is converted at a high efficiency in the form of deep ultraviolet light of a strong monochromaticity.

The second object of the present invention is achieved by a method for modifying the film of a photosensitive chemical material in the method for forming film patterns of the photosensitive chemical material using the photochemical reaction of said photosensitive chemical material, comprising the steps of irradiating said photosensitive chemical material with light having a wavelength of 300 nm or more, and selectively causing the reaction to occur in order to make said photosensitive chemical material generate active oxygen.

In the present invention, active oxygen enables a reaction, which is normally difficult to occur because of large activation energy, to occur easily, and if a reaction different from a series of reactions caused by radical formation occurs, it can be separated to control the reaction. Especially, since the contribution of oxygen to change in pre-tilt angles is necessary, the pre-tilt angles can be controlled easily by controlling the reaction of oxygen.

The third object of the present invention is achieved by a method for modifying the film of a photosensitive chemical material in the method for forming film patterns of the photosensitive chemical material using the photochemical reaction of said photosensitive chemical material, comprising the steps of irradiating said photosensitive chemical material with ultraviolet light in an atmospheric gas containing desired functional groups, thereby introducing said functional groups in the positions of radicals generated by the decomposition reaction of said photosensitive chemical material caused by said photochemical reaction.

In the present invention, by introducing desired functional radicals into a photosensitive material, desired properties caused by the functional radicals can be given to the photosensitive material.

DESCRIPTION OF THE PREFERRED EMBODIMENT

The most preferred aspect of the present invention is a method for patterning the film of a photosensitive chemical material by the photochemical reaction of the photosensitive chemical material, wherein deep ultraviolet light of a selected wavelength emitted from a low pressure mercury lamp or a laser is used as the light source, the photosensitive chemical material is irradiated with deep ultraviolet light according to a pattern, the wavelength absorbed by the photosensitive is adjusted, the amount of the photosensitive chemical material decomposed by the reaction is controlled, and the chemical material is oxidized by generating active oxygen from the photosensitive chemical material when the photosensitive chemical material is irradiated with ultraviolet light.

In this aspect, deep ultraviolet light of a high monochromaticity is obtained in high efficiency by using deep ultraviolet light of a selected wavelength emitted from a low pressure mercury lamp or laser as the light source, the quantity of light can be measured with a good reproducibility, and since the contribution of oxygen to the reaction for changing pre-tilt angles, the reaction of oxygen is controlled with a good reproducibility and pre-tilt angles can be controlled easily.

Also, the most preferred aspect of the present invention is a method for patterning the film of a photosensitive chemical material by the photochemical reaction of the photosensitive chemical material, wherein deep ultraviolet light of a selected wavelength emitted from a low pressure mercury lamp or a laser is used as the light source, the photosensitive chemical material is irradiated with deep ultraviolet light according to a pattern, the reacting amount of the photosensitive chemical material is controlled, and said photosensitive chemical material is irradiated with ultraviolet light in an atmospheric gas according to a pattern for introducing a new functional group into the position of the radical produced by the decomposition reaction of the photosensitive chemical material due to photochemical reaction.

In this aspect, deep ultraviolet light of a high monochromaticity is obtained in high efficiency by using deep ultraviolet light of a selected wavelength emitted from a low pressure mercury lamp or laser as the light source, the quantity of light can be measured with a good reproducibility, and a desired functional group can be introduced with a good reproducibility into the photosensitive chemical material to give desired properties to the photosensitive chemical material.

Figure 1:
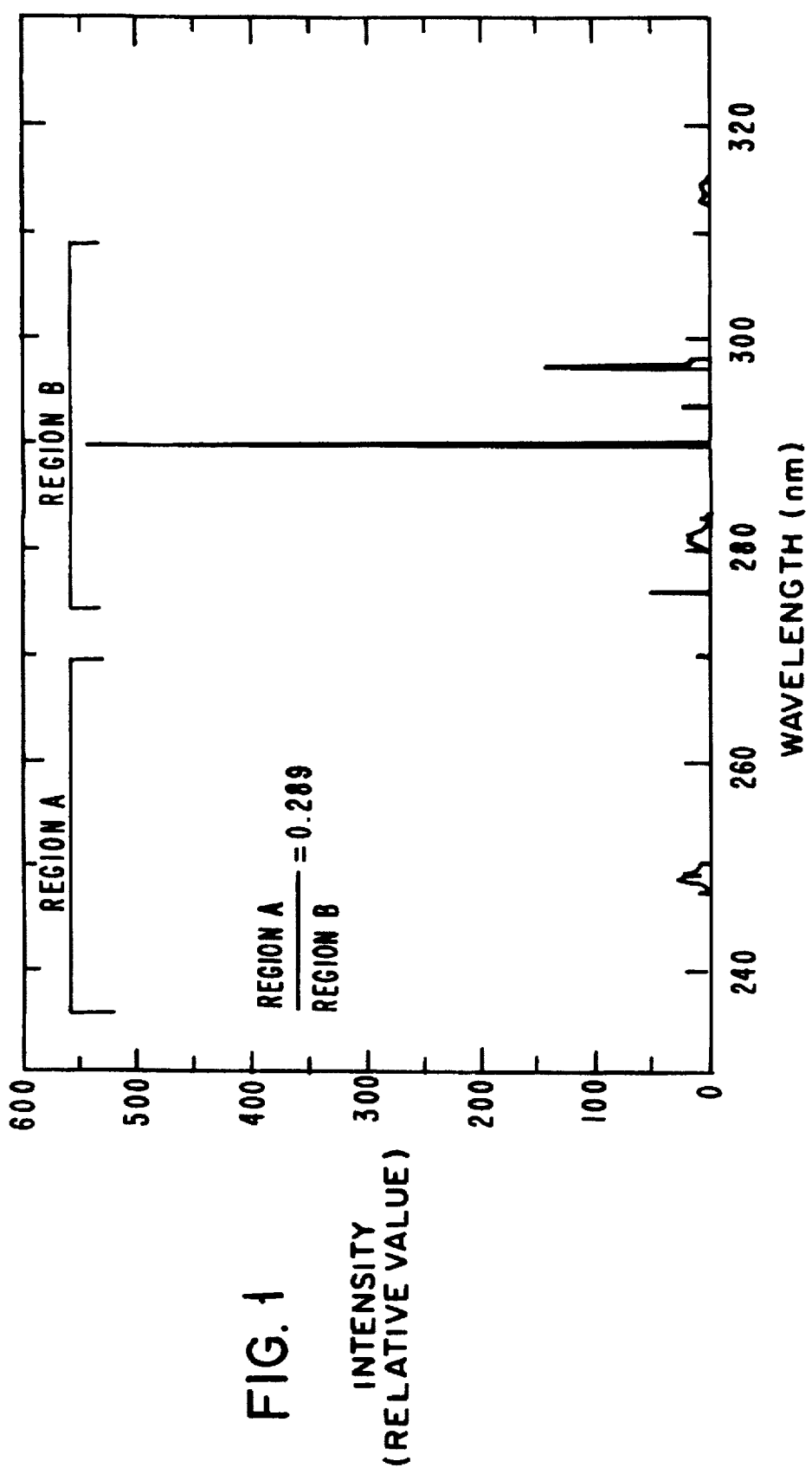
FIG. 1 shows a light source spectrum of a conventional mask aligner using a high pressure mercury-xenon lamp.

The present invention will be described in detail referring to the embodiment. FIG. 1 is a light source spectrum of a conventional mask aligner comprising a high pressure mercury-xenon lamp and a dichroic filter for removing light of a wavelength of 300 nm or longer for deep ultra violet exposure (3 kW mercury-xenon lamp-A: after using for 200 hours). In FIG. 1, spectral intensity around 250 nm is relatively low, but spectral intensity around 290 nm is high because spectrum around this wavelength cannot be removed sufficiently because of the wavelength property of the filter.

Figure 2:
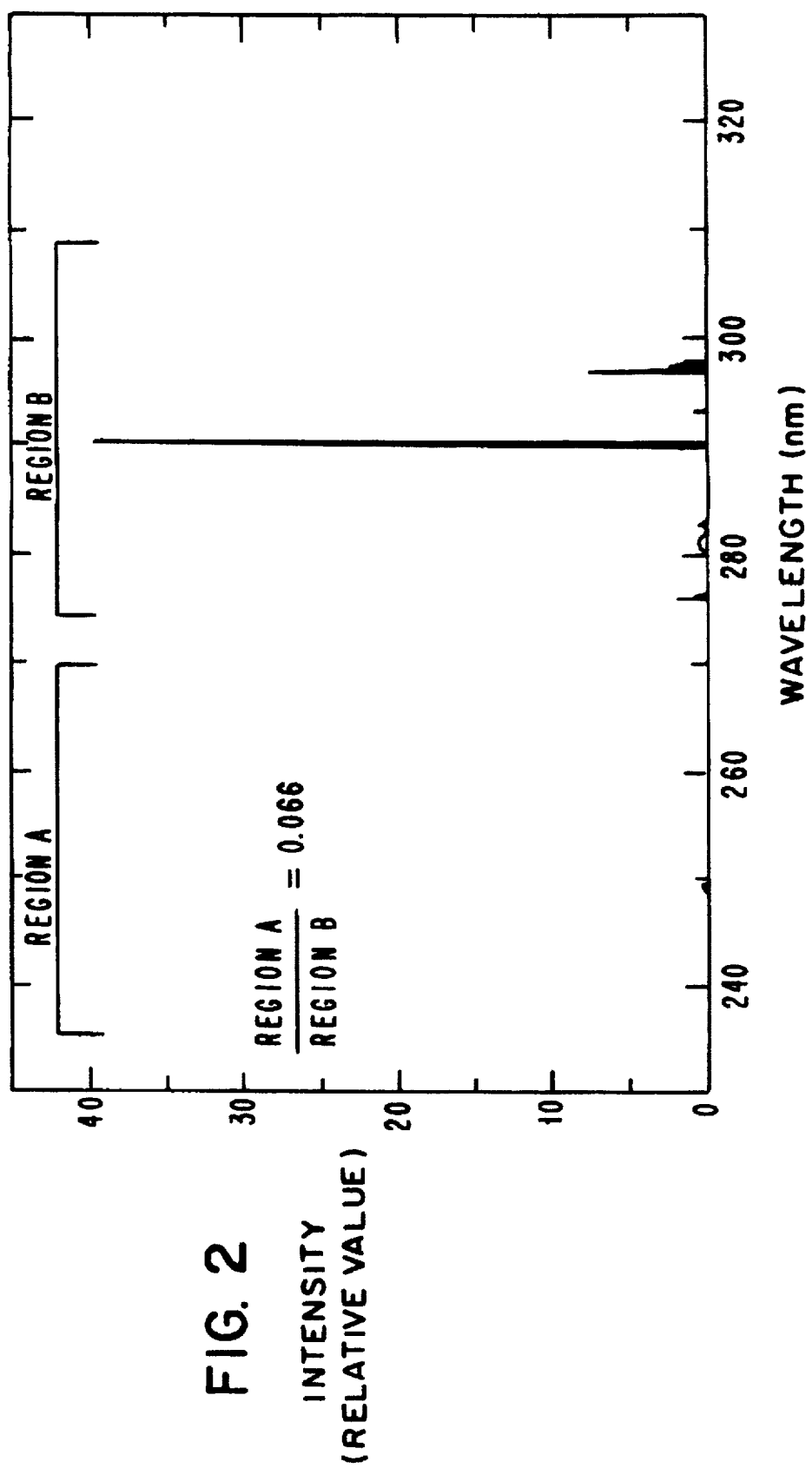
FIG. 2 shown a spectrum of a high pressure mercury-xenon lamp replaced by another lamp of the same model number.

FIG. 2 shows the spectrum of a high pressure xenon lamp used in the mask aligner replaced by another lamp of the same model number for comparison (3 kW mercury-xenon lamp-B: new lamp). As FIGS. 1 and 2 show, there is large difference between lamps, and the integrated intensity ratio of spectral components around 290 nm to spectral component around 250 nm is 28.9 percent for the lamp measured in FIG. 1, while the ratio is 6.6 percent for the lamp measured in FIG. 2. Also, it has been known that when a lamp is lit for a long time, the spectral intensity in shorter wavelength deteriorates faster, and the spectrum of a lamp in difficult to control.

These problems have been known to be caused by the instability of spectral intensity ratio, because the spectrum of a mercury-xenon lamp light source consists of a number of line spectrum. This is because the pressure in a lamp is very high causing atoms to collide with each other, and the high energy state of atoms excited by discharge is undergone non-radiation transition to a number of low energy electronic states. The instability of spectral intensity ratio is caused by these electronic states, and is theoretically difficult to avoid as long as a high pressure discharge tube is used as a light source.

As the result, the efficiency of deep ultraviolet emission is as low as 1 percent or below, and since ineffectively consumed energy ultimately causes defects such as temperature rise in the light emitting part, auxiliary devices such as cooling devices and optical filters, causing the equipment to be large and complicated. Also, since the pressure in the quartz tube constituting the mercury-xenon lamp is very high, it is dangerous to handle such a lamp. Also, since the spectrum of the light source consists of a large number of line spectrum, it is difficult to measure the quantity of light with a high reproducibility. Furthermore, since the photosensitive chemical material is excited by the light source having a plurality of spectrum to a plurality of excited states resulting in the start of reaction from a plurality of states, it is considered that the rout of the reaction becomes complicated.

Figure 3:
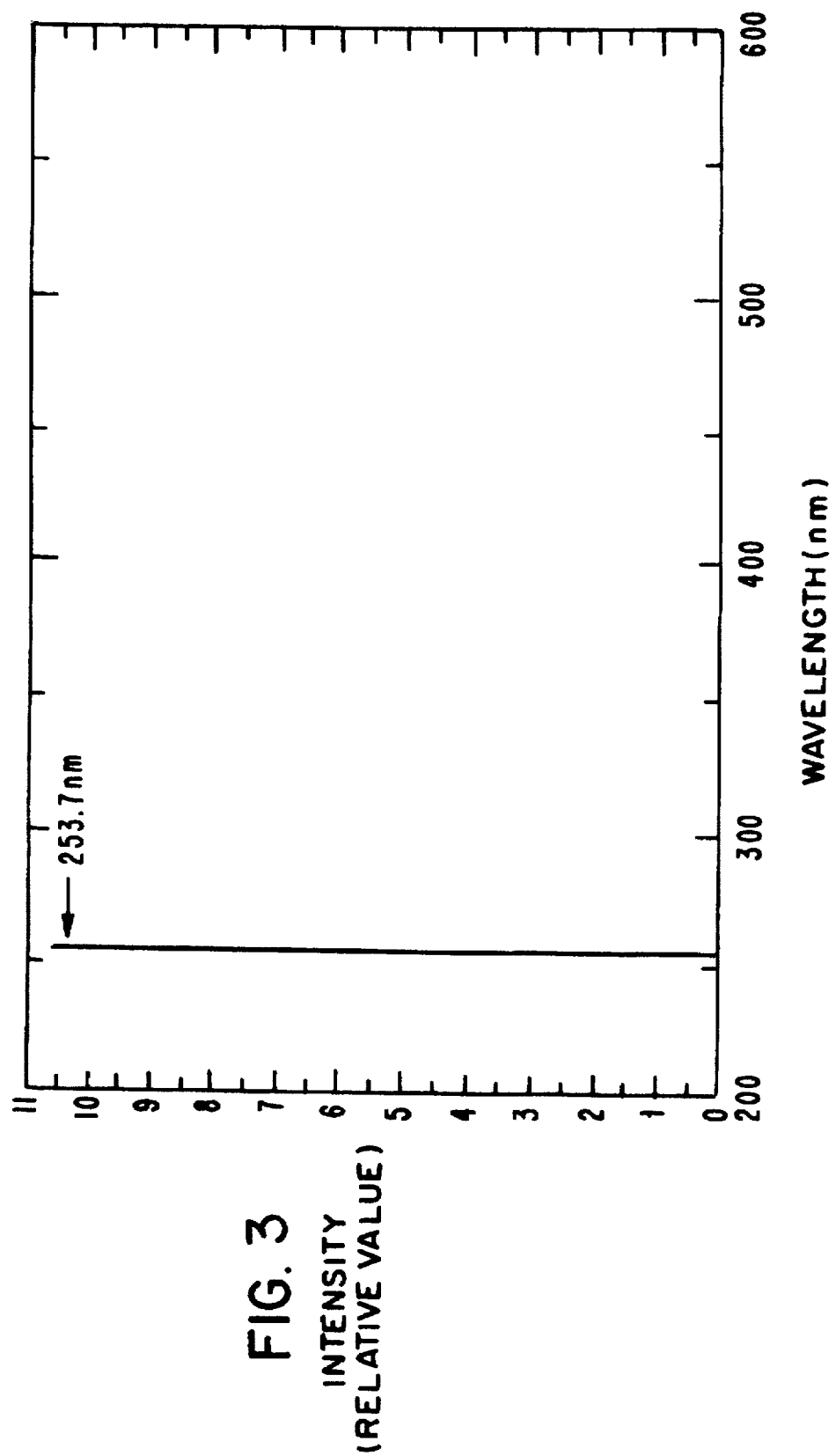
FIG. 3 shows a spectrum of a low pressure mercury lamp.

In the present invention, for example, a low pressure mercury lamp is used as the light source of deep ultraviolet light. In this low pressure mercury lamp, since a large portion of electrical energy is emitted from a long-life metastable state corresponding to the energy of deep ultraviolet light of a wavelength of 253.7 nm of excited mercury atoms, deep ultraviolet light of a wavelength of 253.7 nm having a high monochromaticity is obtained at as high efficiency as about 20 percent. FIG. 3 shows the spectrum of a low pressure mercury lamp. A strong vacuum ultraviolet light of 184.9 nm is also emitted other than the wavelength of 253.7 nm.

However, since this light of 184.9 nm can be absorbed strongly by impurities in quartz used in the discharge tube, as well as by atmospheric oxygen, it can be removed easily if the light of this wavelength is not used. Therefore, the quantity of light can be measured with good reproducibility by using a low pressure mercury lamp as the light source, and the reaction can be controlled accurately by identifying the route of the reaction clearly.

In the present invention, a laser lamp can be used as the light source, other than the low pressure mercury lamp mentioned above. Since the laser lamp is a light source with a single spectrum, the reaction is easily controlled, and since the wavelengths are present within a certain range and specific absorption occurs, the same effect as in a low pressure mercury lamp can be obtained.

However, absorption leading to the desired reaction route of some compounds does not always agree to 253.7 nm. In such a case, the absorption wavelength can be shifted to a longer or shorter wavelength in order to move the location of desired absorption to about 253.7 nm, by introducing an electron donor group or an electron attracting group in the position adjacent to the phenyl group in the compound. Also, if the wavelength of undesired location is around 253.7 nm, the absorption wavelength can be shifted in the same manner.

Figure 4:
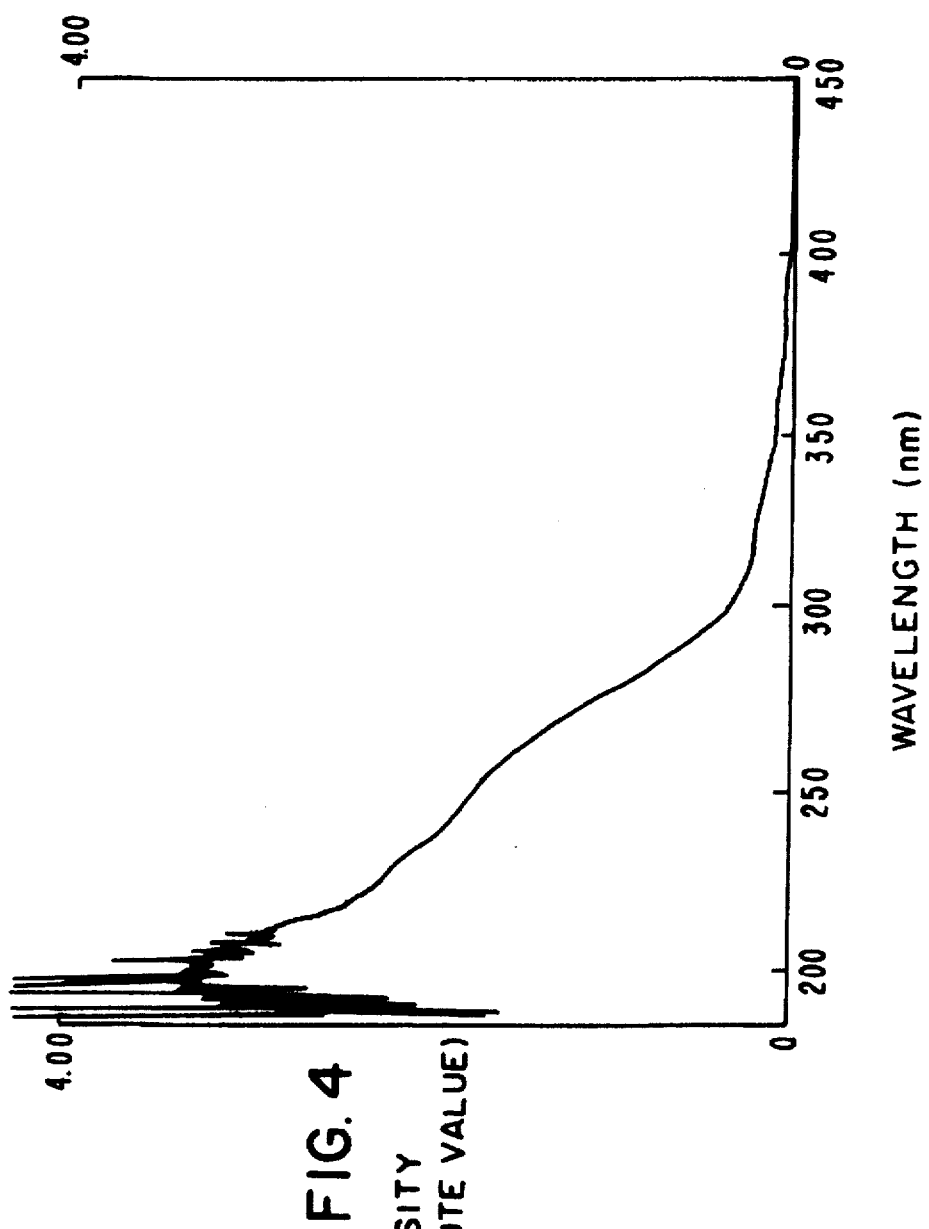
FIG. 4 shows a UV absorption spectrum of polyimide used as a liquid crystal orientation film.

FIG. 4 shows an example of the UV spectrum of polyimide used as a liquid crystal orientation film. From FIG. 4, it is known that a series of absorption around 250 nm is the overlap of absorptions with slightly different wavelengths. Absorption shown in FIG. 5 is the absorption of the polyamic acid before imidization to the same polyimide.

Figure 5:
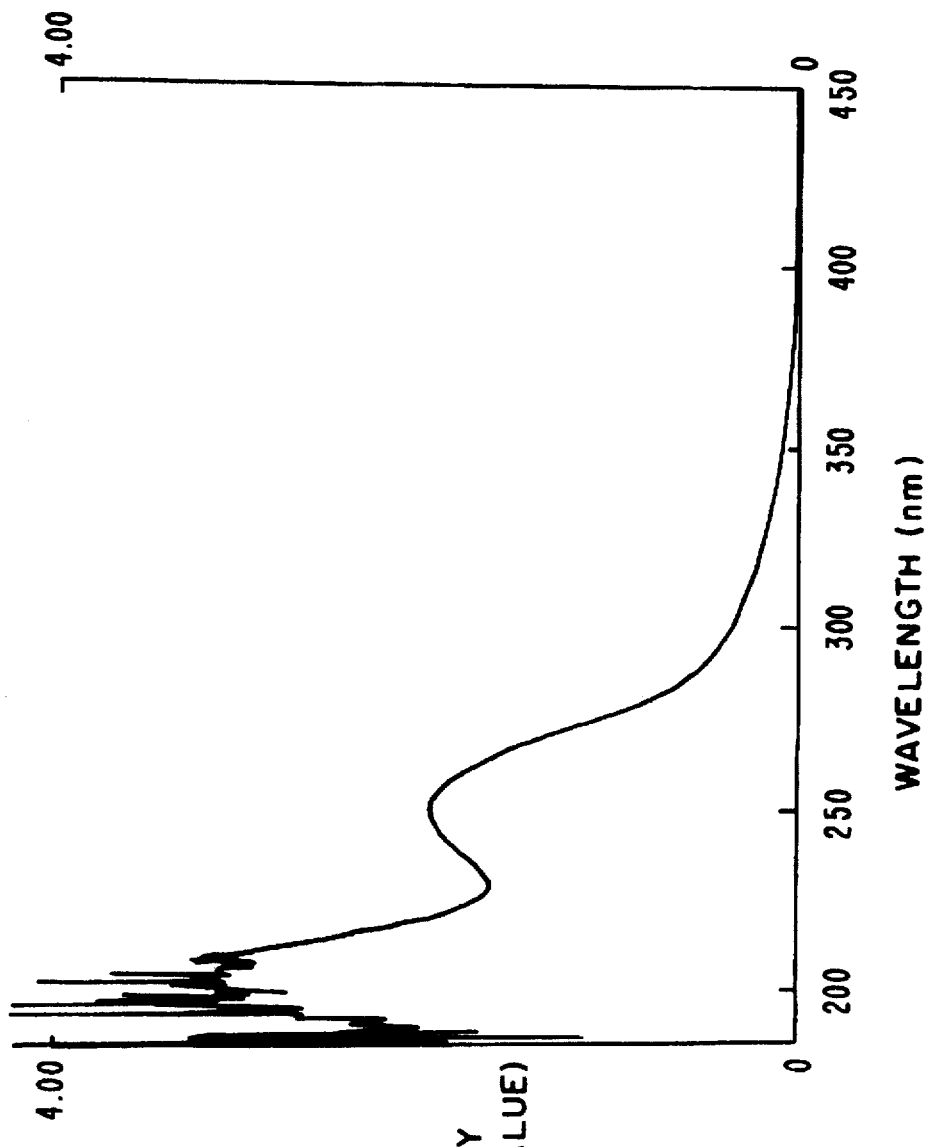
FIG. 5 shows a UV absorption spectrum of polyamic acid before the imidization of the polyimide in FIG. 4, and FIG. 6 shown a graph illustrating the contribution of oxygen to a reaction for pre-tilt angles.

It is known from FIG. 5 that no absorption is seen around 230 nm observed in FIG. 4. From this fact, absorption around 230 nm seen in polyimide is considered to be the absorption of a phenyl group, whose energy levels are perturbed by the presence of a neighboring imide group. Thus, a plurality of absorptions appeared because absorption wavelengths shifted by the difference in the environment of phenyl groups contained in the polymer chain, and absorptions by phenyl groups in different locations overlapped.

Therefore, when polyimide is irradiated with ultraviolet light consisting of a number of line spectrum in a wide wavelength range as in a high pressure mercury-xenon lamp, specific groups in the polymer chain cannot be excited selectively, but phenyl groups in a plurality of locations in different environments are excited simultaneously, inducing a plurality of different photochemical reactions.

After transition to a π–π* electronic state by absorbing deep ultraviolet light, polyimide passes through various reaction routes, and induces chemical change. One of the reactions is the cleavage of the polymer molecular chain and the formation of radicals at the same time, which finally are terminated in some forms. Therefore, a desired functional group can be introduced in the terminating position of the polymer molecule by introducing a suitable gas when irradiated with ultraviolet light, thus giving new desired properties to the polymer. For example, when an alcohol is used as the atmospheric gas, alkyl groups or hydroxyl groups can be introduced. When benzyl chloride (R—O—Cl) is used as the atmospheric gas, a benzyl group (R—O—) can be introduced into the photosensitive chemical material.

With the cleavage of the polyimide due to irradiation with ultraviolet light emitted from the low pressure mercury lamp, it is considered that R.radicals generate, and oxygen reacts by the following reaction to change the polarity of the molecule which has a large effect on pre-tilt angles.

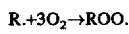

$\Delta H = -10\sim28$ Kcal/mol

In general, the ground state of an organic compound has a singlet spin state, and therefore, by the absorption of ultraviolet light, the compound is maintained in the spin state, and excited to a singlet excited state. It has been observed in many examples that there is a triplet state having the energy lower than this singlet excited state, and after the molecule is once excited to the singlet state, it is converted to the triplet excited state, from which the reaction starts.

On the other hand, since oxygen has a triplet ground state, its chemical reaction activity is generally inhibited; however, when an energy transfer to a molecule in a triplet excited state occurs, singlet oxygen ($O_2{}^1\Delta$) having a very high chemical activity is formed. By the formation of the singlet oxygen, oxygen is allowed to react, and the effect similar to radical reaction can be obtained.

As described above, when a photosensitive chemical material is irradiated with ultraviolet light, (1) radical forming reaction and (2) singlet oxygen forming reaction occur. Although both the reactions contribute to the modification of the surface of the photosensitive chemical material, (1) radical forming reaction is considered to cause the behavior that potential difference between the area irradiated with ultraviolet light and the area not irradiated with ultraviolet light is difficult to occur. When the photosensitive chemical material is allowed to react using light having a wavelength of 300 nm or longer, since (1) radical forming reaction is inhibited, and (2) singlet oxygen forming reaction occurs preferentially, the problems such as the above-mentioned potential difference does not arise, and the surface of the photosensitive chemical material can be modified.

This is realized by providing in the polymer chain an absorbing location having a longer conjugated double bond having an absorption band in visible or infrared light. Also, since the same effect is obtained by the photon absorption of weak energy such as visible and infrared light because of a very small energy difference between the triplet ground state and the singlet excited state of oxygen, the equivalent reaction is allowed to occur by mixing a compound having the above property, such as rhodamine in the polymer film.

Figure 6:
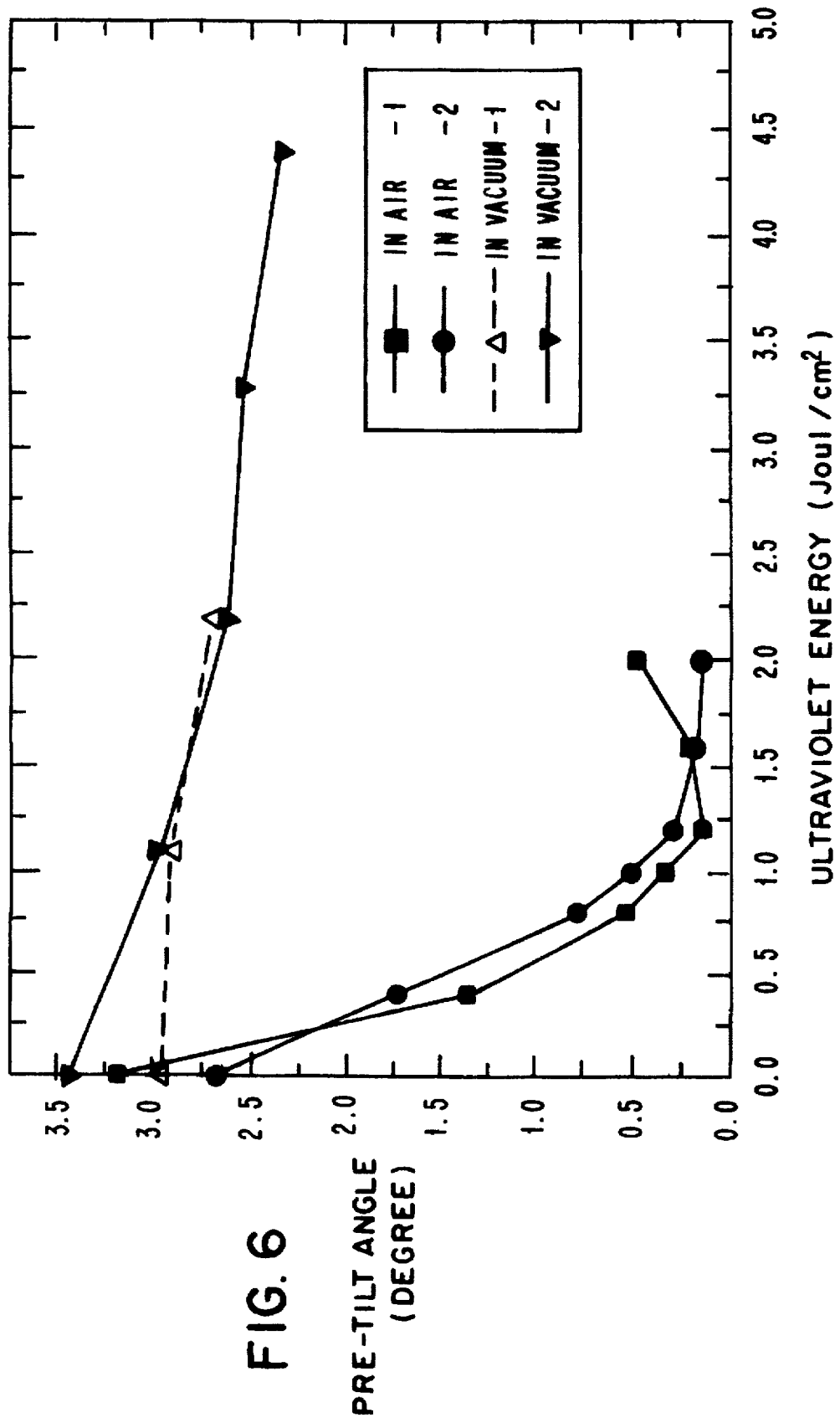

Regarding the contribution of oxygen to pre-tilt angles, an experiment for measuring change in pre-tilt angles was performed by ultraviolet irradiation in vacuum. The results are shown in FIG. 6. It is known from FIG. 6 that the contribution of oxygen to the reaction for changing pre-tilt angles is necessary.

The contribution of radicals to potential difference in a liquid crystal element is also considered. In this case, if a reaction for changing pre-tilt angles can be allowed to take place by singlet oxygen, potential difference between the area irradiated with ultraviolet light and the area not irradiated with ultraviolet light, considered to be caused by radicals, is difficult to occur, and problems such as difference in driving voltage and image sticking are solved.

Although the present invention is described using polyimide as an example of photosensitive chemical material, polystyrene or other polymers containing benzene rings can also be used.

According to a first embodiment of the present invention, the quantity of light can be measured with good reproducibility, and the route of reaction can be known clearly, thus enabling the reaction to be controlled accurately.

According to another embodiment of the present invention, active oxygen can be produced selectively. Therefore, since the contribution of oxygen to the reaction is required for changing pre-tilt angles, the pre-tilt angles can be adjusted easily if the reaction of oxygen can be controlled.

According to still another embodiment of the present invention, desired properties caused by functional groups can be given to a photosensitive chemical material by introducing desired functional groups into the photosensitive chemical material.

We claim:

1. A method for selectively modifying the pre-tilt angle of a liquid crystal oriented film in accordance with a pattern, comprising the steps of:

providing a liquid crystal oriented film of a photosensitive chemical material, the photosensitive chemical material reacting with light having a wavelength within the range of 200 nm to 300 nm to modify the pre-tilt angle of the liquid crystal oriented film; and selectively irradiating said liquid crystal oriented film with a pattern of light emitted from a light source having a line spectrum of substantially a single wavelength, said substantially single wavelength being between 200 nm and 300 nm, thereby selectively modifying the pre-tilt angle of said liquid crystal oriented film in accordance with said pattern.

2. A method for selectively modifying the pre-tilt angle of a liquid crystal oriented film according to claim 1, wherein said light source is a low pressure mercury lamp.

3. A method for selectively modifying the pre-tilt angle of a liquid crystal oriented film according to claim 2, wherein said liquid crystal oriented film is a polyimide-based film.

4. A method for selectively modifying the pre-tilt angle of a liquid crystal oriented film according to claim 1, wherein said liquid crystal oriented film is a polyimide-based film.

5. A method for selectively modifying the pre-tilt angle of a liquid crystal oriented film according to claim 1, wherein said light source is a laser.

6. A method for selectively modifying the pre-tilt angle of a liquid crystal oriented film in accordance with a pattern, comprising the steps of:

providing a liquid crystal oriented film of a photosensitive chemical material, the photosensitive chemical material reacting with light at a wavelength within the range of 300 nm and longer to generate active oxygen and in which generated active oxygen modifies the pre-tilt angle of the liquid crystal oriented film; and selectively irradiating said liquid crystal oriented film with a pattern of light having said wavelength, thereby selectively generating active oxygen in said liquid crystal oriented film in accordance with said pattern to selectively modify the pre-tilt angle of said liquid crystal oriented film in accordance with said pattern.

7. A method for modifying the pre-tilt angle of a liquid crystal oriented film according to claim 6, wherein said light source is a low pressure mercury lamp.

8. A method for selectively modifying the pre-tilt angle of a liquid crystal oriented film according to claim 6, wherein said liquid crystal oriented film is a polyimide-based film.

9. A method for selectively modifying the pre-tilt angle of a liquid crystal oriented film in accordance with a pattern, comprising the steps of:

providing a liquid crystal oriented film of a photosensitive chemical material, the photosensitive chemical material reacting with ultraviolet light in a decomposition reaction that generates radicals and modifies the pre-tilt angle of the liquid crystal oriented film; and selectively irradiating said liquid crystal oriented film with a pattern of ultraviolet light in an atmospheric gas containing at least one desired functional group, thereby introducing said at least one functional group in accordance with said pattern in the positions of radicals generated by the decomposition reaction of said photosensitive chemical material caused by said ultraviolet light and selectively modifying the pre-tilt angle of said liquid crystal oriented film in accordance with said pattern.

10. A method for selectively modifying the pre-tilt angle of a liquid crystal oriented film according to claim 9, wherein said liquid crystal oriented film is a polyimide-based film.

11. A method for selectively modifying the pre-tilt angle of a liquid crystal oriented film according to claim 9, wherein said light source is a low pressure mercury lamp.

* * * * *